United States Patent [19]

Utracki

[11] 4,243,443

[45] Jan. 6, 1981

[54] AZIDE AND DOPED IRON OXIDE GAS GENERATING COMPOSITION

[75] Inventor: Lechoslaw A. M. Utracki, Pierrefonds, Canada

[73] Assignee: C-I-L Inc., Montreal, Canada

[21] Appl. No.: 45,584

[22] Filed: Jun. 4, 1979

[30] Foreign Application Priority Data

Jul. 17, 1978 [CA] Canada ................................. 307563

[51] Int. Cl.³ ............................................. C06B 35/00
[52] U.S. Cl. ......................................... 149/35; 149/37
[58] Field of Search .................................... 149/35, 37

[56] References Cited

U.S. PATENT DOCUMENTS

| | | |
|---|---|---|
| 3,821,120 | 6/1974 | Lipscomb, Jr. et al. ............... 149/37 |
| 3,890,174 | 6/1975 | Helms, Jr. et al. .................... 149/37 |
| 3,912,646 | 10/1975 | Leitner et al. ...................... 252/62.56 |
| 3,931,025 | 1/1976 | Woditsch et al. ................... 252/62.56 |
| 3,996,079 | 12/1976 | DiValentin ............................. 149/35 |
| 4,062,708 | 12/1977 | Goetz ..................................... 149/35 |

FOREIGN PATENT DOCUMENTS 895179  5/1962  United Kingdom .................. 252/62.56

*Primary Examiner*—Edward A. Miller
*Attorney, Agent, or Firm*—Donald G. Ballantyne

[57] ABSTRACT

A nitrogen gas generating composition is provided which consists of a stoichiometric mixture of an alkali metal azide or an alkali earth metal azide and a doped iron oxide of high chemical reactivity. The doped iron oxide contains up to 1.0% by weight of another metal oxide impregnated into its particle lattice. The resulting composition has improved properties of ignition delay time, total burn time, filter-ability and reduced toxic by-products.

4 Claims, No Drawings

AZIDE AND DOPED IRON OXIDE GAS GENERATING COMPOSITION

This invention relates to a chemical gas generating composition in solid form capable, upon ignition, of rapidly producing large volumes of non-toxic gases. The gas generating composition of the invention is particularly adapted for inflating safety crash bags in vehicle occupant passive restraint systems.

The use of protective gas inflated bags to cushion vehicle occupants in a crash situation is now widely known and well documented. In the first devised systems of this type, a quantity of compressed, stored gas was employed to inflate a crash bag which upon inflation was imposed between the occupant and the windshield, steering wheel and dashboard of the vehicle. In response to rapid deceleration of the vehicle, as in an accident situation, the stored gas was released through a quick-acting valve or the like to inflate the crash bag. Because of the bulk of the stored gas apparatus, its generally slow reaction time and its maintenance difficulties, this stored, pressurized gas system has now largely been superseded by a system which utilizes the gases generated by the ignition of a chemical gas generating or pyrotechnic substance or composition. Such a chemical system employs an ignition means such as an electrically activated squib or the like associated with a suitable sensing means to ignite the gas generating composition.

A large number of quick-burning, gas generating compositions have been proposed for crash bag inflation purposes, many of which have proven deficient in one respect or other. It has been a preoccupation of the industry to develop a gas generating composition which combines the essential features of a short induction period, a burn rate which is rapid but even without any explosive effect, a high bulk density so that only small volumes of compositions are required to produce large amounts of gas, the production of only non-toxic gases so that vehicle occupants are not endangered in the event of a leak or during the venting of the crash bag after deployment, the production of gases at a relative low temperature so that damage to the crash bag minimized and occupants are not burned, good filterability of the reaction products so that hot solid residue cinders are simply removed from the gas stream, and strong physical form so that long periods of storage can be attained under wide ranging conditions of temperature and shock. While some or other of these desirable properties are found in known chemical gas generating compositions, heretofore it has not been possible to provide a single composition which satisfies all the requirements of the industry.

A large number of gas generating compositions suitable for use in crash bag inflation are disclosed in the literature. For example, Boyer in U.S. Pat. No. 2,981,616 describes a composition consisting of an alkali metal or alkali earth metal azide in admixture with metallic nitrates, metallic peroxides or inorganic perchlorates as oxidizers. Hendrickson et al. in U.S. Pat. No. 3,741,585, describes a combination of metallic azides with metallic iodides, sulphides, oxides and sulphur. Sidebottom in U.S. Pat. No. 3,883,373 describes a particulate mixture of azide with an oxidizing salt, a metal and a metal oxide. Pietz in U.S. Pat. No. 3,895,098, discloses a mixture of alkali metal azide and a metallic oxide such as iron oxide, titanium oxide, and copper oxides. T. Shiki et al. in U.S. Pat. No. 3,904,221, describes a mixture of an alkali metal azide or alkali earth metal azide or a hydroxy metal azide together with an oxidizing agent such as various perchlorates, nitrates and metal oxides. DiValentin in U.S. Pat. No. 3,996,079, describes a method of preparing clean-burning mixture of iron or nickel oxide and metal azide by utilizing a wet granulation manufacturing process. Goetz in U.S. Pat. No. 4,062,708 employs very fine particles of oxides of iron, nickel or cobalt in combination with an alkali metal azide. All of the aforementioned compositions tend to be deficient in one or more respects as noted heretofore to the extent that there still exists a need for an improved gas generating composition which will provide clean, low-temperature, non-toxic gases at a burn rate high enough to be employed in crash bag inflation.

The utility of heating an alkali metal azide, such as sodium azide, to liberate large volumes of nitrogen gas has been long known. In order to sustain a chemical reaction and to take up the liquid sodium produced during dissociation of sodium azide during burning, a coreactant is normally required which coreactant is selected to (a) avoid the formation of any of the known highly explosive azides and (b) avoid the generation of highly toxic hydrazoic acid. Thus the suitable coreactants are generally limited to non-heavy metal oxides and various oxidizing salts. When such coreactants are employed in combination with an alkali metal azide, a further consideration is to avoid the formation of toxic oxides of nitrogen during combination of the mixtures. High burning temperatures tend to direct the chemical reaction towards the formation of these toxic oxides, hence the reaction temperature is desirably kept as low as possible. An additional consideration with respect to toxicity in use of these compositions is to prevent the generation of fine reactant dust particles which could escape filtration and be inhaled by a vehicle occupant.

From a consideration of the costs of manufacture, the toxicity and the availability of various coreactants, a particularly suitable material for use in combination with an alkali metal or earth metal azide is iron oxide, $Fe_2O_3$. As noted heretofore, a number of prior references have been made to the use of azides in combination with metallic oxides including iron oxide (See, in particular, U.S. Pat. Nos. 3,895,098, 3,931,040, 3,996,079 and 4,062,708).

From an examination of the burning reaction of sodium azide with various commercially available grades of iron oxide in stoichiometric proportions, e.g.:

$$4NaN_3 + Fe_2O_3 \rightarrow (Na_2O)_2FeO + 6N_2$$

the following observations can be made:
(a) the reaction flame temperature is about 800° C. or about 200° C. below that theoretically expected;
(b) the quantity of liquid sodium generated is large (up to 2.5%);
(c) a large amount of fine dust particles of sub-micron size are produced;
(d) reproducibility of burn characteristics from test to test is erratic.

From these results it can be concluded that iron oxide in its usual commercial form is not a particularly suitable coreactant for sodium azide notwithstanding the allegations and claims of the prior art. It has now been found, however, that useful results are achievable by employing a modified type of iron oxide which enhances the rate of diffusion of the sodium towards the sites of oxygen atoms, (and thus takes up liberated metallic sodium) and which catalyses the thermal decomposition of sodium azide to improve burning rates and gas generation and reduce dust formation.

The present invention provides a pyrotechnic gas generating material comprising an admixture of an alkali metal azide or an alkali earth metal azide and a modified iron oxide, the said modified iron oxide comprising a distorted crystalline structure wherein a second metallic oxide is incorporated in the crystal lattice of the iron oxide. In particular, the invention provides for the use in combination with an alkali metal azide or alkaline earth metal azide of a doped iron oxide wherein the doping agents are selected from nickel oxide and cobalt oxide. The term "doped iron oxide" is used to mean an iron oxide crystal or particle wherein one or more foreign materials are deliberately introduced into the iron oxide structure in small amounts, usually of not more than 1.0% by weight of the total. Doped metal oxides are widely employed in, for example, the manufacture of electronic components where semi-conductive materials, magnetic materials and the like are prepared from doped metallic oxide particles. Preparation of doped iron oxide suitable for use in the improved gas generating composition of the present invention involves the co-crystallization of iron oxide and nickel or other metal oxides or hydroxides from acidic or alkaline solutions. The co-crystals are thereafter calcined/oxidized under a stream of air to produce a nickel-doped or other metal-doped iron oxide particles having a generally acicular shape. This process is further described in patent application Ser. No. 47,000, titled "Adulterated Iron Oxide of High Chemical Reactivity" filed concurrently herewith.

It has been surprisingly discovered that a gas generating composition comprising an alkaline metal azide or alkaline earth metal azide in admixture with a metal doped iron oxide, in particular with nickel doped iron oxide, provides a substantial improvement in ignition delay time, total burn time, filterability and reduction of toxic by-products over a similar gas generating composition employing commercial (undoped) iron oxide.

The alkali metal azide or alkali earth metal azide used in the composition of the invention is preferably sodium azide or potassium azide since these materials are most easily procured in commercial quantities. However, any alkali metal or earth metal azide may be employed. Preferably the alkali metal azide or alkali earth metal azide employed has a grain size less than that held on a 100 Tyler mesh screen. The particle size of the doped iron oxide used is of the range of less than 10 microns and preferably between 0.5 and 2 microns. The gas generating material for burning is advantageously prepared by the method disclosed by DiValentin in U.S. Pat. No. 3,996,079 which method provides a wet-process extrudate of a substantially stoichiometric mixture of azide and oxide which has been dried to form agglomerated granules. The granules are then screened to remove fine dust or overly large pieces. Alteratively, a stoichiometric mixture of the azide and oxide particles may be dry blended, preferably in a ball mill or similar apparatus, and thereafter pressed into cylindrical pellets or aspirin-shaped tablets.

The following examples and table illustrate the substantial improvements provided by the gas generating composition of the present invention.

EXAMPLES 1-26

Near stoichiometric proportions (4% $Fe_2O_3$ deficiency) of sodium azide and iron oxides, both screened through 100 Tyler mesh, were blended dry for 2 hours in a ball mill then pressed at 10,000 psi into 20 g, 1 inch diameter pellets. One pellet at a time was burned in a pressure vessel of 185 ml volume using an electric squib and 2 g of a gasless initiating powder to ignite the pellets. The burn performance was monitored by piezoelectric transducer connected to a digital oscilloscope. Pressure P and rate of pressure change dP/dt were recorded. It was found that the reduced maximum rate of pressure increase $R=(1/P)(dP/dt)_m(sec^{-1})$ is proportional to the linear burn rate r (inches/min) (as determined in cigar-type burn test) and is simple to measure. Hence in these tests, R and the ignition delay time, $\tau i$, were used to characterize the ballistic performance. This second parameter is defined as a time span to the intercept of the steady state pressure increase to a base line. Average values from three to five burn tests of each composition are recorded in Table I below.

TABLE I

| | Iron Oxide | | | | Pyrotechnic | | |
|---|---|---|---|---|---|---|---|
| Example No. | Type | Cryst. Form. | Particle size (μm) | Surface area (m²/g) | Na % | Burn rate R (sec⁻¹) | Ignition Delay time $\tau_i$ (sec) |
| 1 | Commercial $Fe_2O_3$ | Spherical | 6 | 0.1 | — | No ignition | — |
| 2 | Commercial $Fe_2O_3$ | Acicular | 1 | 3.3 | 0.9 | 0.93 | 0.94 |
| 3 | Commercial $Fe_2O_3$ | Cubical | 0.6 | 4.5 | 1.9 | 0.82 | 1.25 |
| 4 | Commercial $Fe_2O_3$ | Acicular | 0.3 | 95.0 | 0.8 | 1.01 | 0.94 |
| 5 | Cobalt doped 0.05% | Acicular | — | — | — | 1.91 | 0.61 |
| | Nickel doped samples: | | | | | | |
| 6 | 0.04% | Acicular | 0.54 | 21 | 0.14 | 2.3 | 0.55 |
| 7 | 0.12 | Acicular | 1.3 | — | 0.19 | 2.2 | 0.43 |
| 8 | 0.20 | Acicular | 0.7 | — | 0.02 | 2.3 | 0.53 |
| 9 | 0.55 | Acicular | 0.6 | — | >0.013 | 2.6 | 0.35 |
| 10 | 0.02 | Acicular | 0.3 | 180 | 0.97 | 2.1 | 0.41 |
| 11 | 0.18 | Acicular | 1.1 | 110 | 0.10 | 2.2 | 0.55 |
| 12 | 0.04 | Acicular | 0.5 | 41 | 0.57 | 2.3 | 0.55 |
| 13 | 0.50 | Acicular | 3.5 | 87 | 0.18 | 2.6 | 0.58 |
| 14 | 0.05 | Acicular | 0.7 | 95 | 0.05 | 1.8 | 0.81 |
| 15 | 0.11 | " | 3.2 | 3.2 | 0.017 | 1.6 | 1.04 |
| 16 | 0.16 | Hexagonal | 1.62 | 9.2 | — | 1.3 | 0.76 |
| 17 | 0.18 | " | 2.97 | 10.2 | — | 1.5 | 0.72 |
| 18 | 0.06 | " | 0.69 | 7.0 | — | 1.1 | 0.82 |
| 19 | 0.06 | " | 0.69 | 8.6 | — | 1.3 | 0.78 |
| 20 | 0.07 | " | 0.86 | | — | 1.2 | 0.73 |
| 21 | 0.05 | " | 2.67 | 10.0 | — | 1.4 | 0.69 |

TABLE I-continued

| | Iron Oxide | | | | Pyrotechnic | | |
|---|---|---|---|---|---|---|---|
| Example No. | Type | Cryst. Form. | Particle size (μm) | Surface area (m²/g) | Na % | Burn rate R (sec⁻¹) | Ignition Delay time $\tau_i$ (sec) |
| 22 | 0.06 | " | 0.57 | 9.3 | — | 1.6 | 0.67 |
| 23 | 0.16 | " | 0.78 | 9.4 | — | 1.5 | 0.75 |
| 24 | 0.04 | " | 1.70 | 8.0 | — | 1.3 | 0.82 |
| 25 | 0.61 | Spherical | 2.90 | 6.8 | 1.1 | 1.3 | 0.81 |
| 26 | 0.17 | " | 3.80 | 6.3 | 1.0 | 1.0 | 0.98 |

The following observations may be made with respect to the test results shown in Table I. The iron oxide samples used in Examples 1–15 were prepared by crystallization from an acidic medium and results in needle-like crystals of predominantly α-Fe₂O₃. Subsequent calcination at low temperature produced a porous structure and resulted in a firable material having a large surface area. Calcination at high temperature results in coalescence and formation of high density, low surface area material. An examination of both the ordinary commercial grade of low calcination temperature iron oxide and of low calcination temperature doped iron oxide show an increase in spacing within the crystal lattice with the doped material thus demonstrating a distortion of the crystal structure of the iron oxide. Use of this doped (distorted) iron oxide leads to an improvement in the burn rate and ignition delay time and a reduction in sodium evolution as shown in Table I.

The iron oxide samples used in Examples 16–26 were prepared from alkaline solution. The conversion from magnetite to α-Fe₂O₃ was carried out above the Curie-point at 600° C. The resulting material in form of hexagonal or spherical particles when mixed with sodium azide showed significant improvement of performance over the standard commercial iron oxide prepared under analogous conditions. This improvement was however smaller than that observed for samples crystallized from acidic medium.

EXAMPLES 27–33

Using stoichiometric mixtures of the iron oxides shown in Table I and sodium azide of particle size below 50 μm, pyrotechnic compositions were prepared according to the wet granulation process detailed in U.S. Pat. No. 3,996,079. The grains were made in a form of 0.14" O.D., 0.04" I.D., 0.4" long hollow cylinders. Fourteen gram quantities were burned in a generator of 15 g capacity without a filter, inside a pressure vessel. Ignition was by means of electric squib and 0.5 g of black powder.

As before, P and dP/dt in the high pressure vessel were recorded. The results of the tests are shown in Table II.

TABLE II

| Example No. | Oxide Sample | Bulk Density (g/cc) | $\tau_i$ (s) | R (s⁻¹) | Na in cinder % | Dust a | NOX (ppm) |
|---|---|---|---|---|---|---|---|
| 27 | Ex. 2 | 1.031 | 0.268 | 4.8 | 0.25 | 6 | <0.5 |
| 28 | 3 | 1.022 | 0.325 | 5.2 | 1.25 | 9 | |
| 29 | 13 | 1.082 | 0.123 | 9.2 | 0.10 | 4 | |
| 30 | 14 | 0.941 | 0.178 | 10.0 | 0.05 | 3 | <0.5 |
| 31 | 15 | 1.155 | 0.128 | 10.6 | 0.05 | 1 | <0.5 |
| 32 | 25 | 1.133 | 0.112 | 10.8 | 0.05 | 3 | <0.5 |
| 33 | 26 | 1.097 | 0.108 | 11.9 | 0.15 | 4 | <0.5 | a = on an arbitrary scale from 0 to 10, on visual inspection of deposit in vessel.

Because of the use of a strong igniter, the values of $\tau_i$ show less spread than those in Table I. The data demonstrate superiority of the doped materials, in terms of ignitibility, burn rate, conversion (as measured by the amount of free sodium) and cleanliness of gas.

EXAMPLES 24–36

To isolate the effect of surface-attached nickel oxide from that of nickel oxide incorporated into the crystalline structure of the iron oxide, a series of compositions was made in which oxide sample No. 2 from Table I was used and NaN₃ was co-crystallized with NiSO₄. The amount of Ni used is expressed as % of NiO per (Fe₂O₃+NiO) in the sample and can be compared directly with those in Table I. The data are shown in Table III.

TABLE III

| Ex. No. | Density (g/cc) | % Ni | Composition$^a$ Fe₂O₃/NaN₃ | $\tau_i$ (s) | R (s⁻¹) | Form |
|---|---|---|---|---|---|---|
| 34 | 2.002 | 0.00 | −4 | 0.96 | 1.12 | pellet 20 g |
| 35 | 1.063 | 0.05 | −4 | 0.90 | 1.20 | pellet 20 g |
| 36 | 1.975 | 0.15 | −4 | 0.82 | 1.52 | pellet 20 g |
| 37 | 1.106 | 0.00 | 0 | 0.16 | 8.30 | extrudates 14 g |
| 38 | 1.119 | 0.15 | 0 | 0.14 | 11.1 | extrudates 14 g |

$^a$ = excess of Fe₂O₃ over that required for the reaction 4 NaN₃ + Fe₂O₃ → (Na₂O)₂FeO + Fe + 6N₂

The multiple regression analysis of the burn parameters of the pyrotechnics prepared from acicular Fe₂O₃ allowed calculation of R for samples 34 and 35 as 1.32 and 1.84 (s⁻¹) respectively. These two sets of values suggest that the effectiveness of Ni²⁺ incorporated into NaN₃ is only about ½ of that achieved when introduced into the Fe₂O₃ crystalline matrix. In other words it is not merely a catalytic effect of Ni²⁺, but also the distortion of α-Fe₂O₃ structure which is responsible for the improvement of performance of the pyrotechnic material containing doped iron oxide.

EXAMPLES 37–41

Linear burn rates of stoichiometric sodium azide/iron oxide/sodium nitrate compositions were measured. The composition (50 g) was compressed at 60,000 psi into a heavy wall generator. In two instances the composition was boosted by the addition of a small amount of sodium oxide/sodium nitrate system. Varying the size of the outlet orifice, desirable stable burning pressures in the range 300–3000 psi were obtained. From the logarithmic plot of the burn rate, r (inches/min) vs pressure p (psi) the parameters of the equation $$r = Kp^n$$

were determined. The results are tabulated below in Table IV.

TABLE IV

| Ex. No. | Iron Oxide Used No. from Table I | % NaNO₃ | NOX (ppm) | K | n | r at 1000 psi |
|---|---|---|---|---|---|---|
| 37 | Ex. 2 | 0 | <0.5 | 1.44 | 0.36 | 17 |
| 38 | Ex. 2 | 2.3 | 28 | 0.79 | 0.58 | 42 |
| 39 | Ex. 2 | 4.1 | 130 | 0.13 | 0.85 | 46 |
| 40 | Ex. 147 | 0 | <0.5 | 3.49 | 0.36 | 42 |
| 41 | Ex. 15 | 0 | <0.5 | 3.09 | 0.34 | 32 |

From the results shown in Table IV it will be seen that the use of doped iron oxide increases the linear burn rate of the compositions by a similar factor as observed in R-value (Table I). Burn rates at 1000 psi similar to those recorded for the pyrotechnics containing doped iron oxides can be obtained by "boosting" the $Fe_2O_3/NaN_3$ compositions with $NaNO_3$, as shown in Examples 38 and 39. This, however, significantly increases the amount of NOX and the value of the parameter n. The need for low NOX values is obvious. Similarly a low pressure coefficient of burn rate n is particularly desirable. Since the gas generating material in a crash bag system is required to burn during a very short time interval, a reliable burn rate and gas generation is essential. In order to minimize variablity of burn rate with pressure, it is important that the materials be selected which give the smallest value of parameter n.

EXAMPLES 42–43

Gas generating compositions in the form of extruded hollow cylinders weighing 105 g were loaded into a standard driver-side generator containing a filter pack having 1–3 μm diameter pores. The charge was ignited by means of an electric squib and 2 g of a gasless ignition powder. The generator was affixed to a pressure vessel. Generator and pressure vessel pressures were measured. The cleanliness of the gas was determined by visual inspection of the witness plate (for dust) and by analysis of the gases for NOX, CO and $NH_3$. The results are reported in Table V.

TABLE V

|  | Example 42 | Example 43 |
|---|---|---|
| Iron oxide used (Table I) | 2 | 15 |
| First gas (ms) | 13 | 4 |
| Max. Generator Pressure (psi) | 4900 | 1560 |
| Total burn time (ms) | 180 | 68 |
| Maximum (dp/dt) (psi/ms) | 1.47 | 1.49 |
| Gas analysis in ppm: $NH_3$ | 46 | 15 |
| NOX | 11 | <0.5 |
| CO | 530 | 280 |
| Dirt on 0–10 scale | 9 | 1 |

What we claim is:

1. A solid nitrogen gas generating composition comprising a substantially stoichiometric admixture of an alkali metal azide or an alkali earth metal azide and a doped iron oxide, said doped iron oxide comprising an acicular iron oxide particle having an amount of up to 1.0% by weight of other metal oxide selected from nickel oxide and cobalt oxide impregnated into the iron oxide lattice, said doped iron oxide further having a particular size of less than 10 microns.

2. A composition as claimed in claim 1 wherein the alkali metal azide is sodium azide.

3. A composition as claimed in claim 1 wherein the particle size of the doped iron oxide is from 0.5 to 2 microns.

4. A composition as claimed in claim 1 wherein the iron oxide which is doped is $\alpha\text{-}Fe_2O_3$.

* * * * *